United States Patent
Lopez Alvarez et al.

(10) Patent No.: US 11,451,686 B2
(45) Date of Patent: Sep. 20, 2022

(54) PRINTING SYSTEM CALIBRATION USING REFERENCE PRINTING DEVICE

(71) Applicant: Hewlett-Packard Development Company, L.P., Spring, TX (US)

(72) Inventors: Miguel Angel Lopez Alvarez, Vancouver, WA (US); Hsue-Yang Liu, Vancouver, WA (US); Jay S Gondek, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/975,238

(22) PCT Filed: Mar. 13, 2018

(86) PCT No.: PCT/US2018/022081
§ 371 (c)(1),
(2) Date: Aug. 24, 2020

(87) PCT Pub. No.: WO2019/177583
PCT Pub. Date: Sep. 19, 2019

(65) Prior Publication Data
US 2020/0412914 A1    Dec. 31, 2020

(51) Int. Cl.
*H04N 1/60*    (2006.01)
*H04N 1/00*    (2006.01)

(52) U.S. Cl.
CPC ....... *H04N 1/6008* (2013.01); *H04N 1/00005* (2013.01); *H04N 1/00034* (2013.01)

(58) Field of Classification Search
CPC ............. H04N 1/6008; H04N 1/00005; H04N 1/00034
(Continued)

(56) References Cited

U.S. PATENT DOCUMENTS 6,654,143 B1    11/2003  Dalal et al.
7,069,164 B2     6/2006  Viturro et al.
(Continued)

FOREIGN PATENT DOCUMENTS

EP       2003431 B1    12/2008

OTHER PUBLICATIONS

Shaw Mark et al ., Color Printer Characterizatin Adjustment For Different Substrates, Nov. 6, 2002, Wiley Periodicals ~ 14 pages.

*Primary Examiner* — Quang N Vo
(74) *Attorney, Agent, or Firm* — Michael Dryja

(57) ABSTRACT

Color values are measured for a set of color targets printed by a reference printing device on a medium of a reference media type. A different printing device prints a subset of the set of color targets on another medium of this reference media type. The color values of the subset of color targets printed by the different printing device are measured, and the different device calibrated based on the measured color values for both the set that the reference printing device printed and the subset that the different device printed. The different printing device can then also be calibrated for a different media type, based on a transformation of the set of color targets printed by the reference printing device on a medium of the different media type relative to the set of color targets printed by the reference device on the medium of the reference media type.

15 Claims, 5 Drawing Sheets

(58) Field of Classification Search
USPC .......................................... 358/1.6, 1.15, 1.9
See application file for complete search history.

(56) References Cited

U.S. PATENT DOCUMENTS

| | | |
|---|---|---|
| 7,411,700 B2 | 8/2008 | Johnson |
| 7,414,752 B2 | 8/2008 | Adam et al. |
| 8,009,324 B2 | 8/2011 | Reed |
| 8,169,660 B2 | 5/2012 | Oles |
| 8,358,440 B2 | 1/2013 | Ernst et al. |
| 9,205,691 B1 | 12/2015 | Jones |
| 2007/0086009 A1 | 4/2007 | Ehbets |
| 2009/0231374 A1 | 9/2009 | Van de Wynckel et al. |
| 2011/0122185 A1 | 5/2011 | Lutz |
| 2013/0135635 A1* | 5/2013 | Nakamura ............. H04N 1/603 358/1.9 |
| 2017/0244869 A1* | 8/2017 | Uroz Soria .......... H04N 1/6033 |
| 2018/0063383 A1* | 3/2018 | Soriano ................ H04N 1/6019 |
| 2019/0266455 A1* | 8/2019 | Ferreri ............... G06K 15/1802 |

\* cited by examiner

PRINTING SYSTEM CALIBRATION USING REFERENCE PRINTING DEVICE

BACKGROUND

Printing devices include standalone printers, as well as all-in-one (AIO) and multifunction printer (MFP) devices that include functionality like scanning, copying, and/or faxing functionality in addition to printing functionality. To print full color images onto print media like paper, printing devices can include colorants, such as toner or ink, which may correspond to the colors of a process color space, which can be considered as the native color space of a printing device. For example, a printing device may include colorants corresponding to the cyan, magenta, yellow, and black colors of the cyan-magenta-yellow-black (CMYK) color space. Other kinds of printing devices include three-dimensional (3D) printing devices, which output layers of material that build up upon one another to form a 3D object.

DETAILED DESCRIPTION

Figure 1:
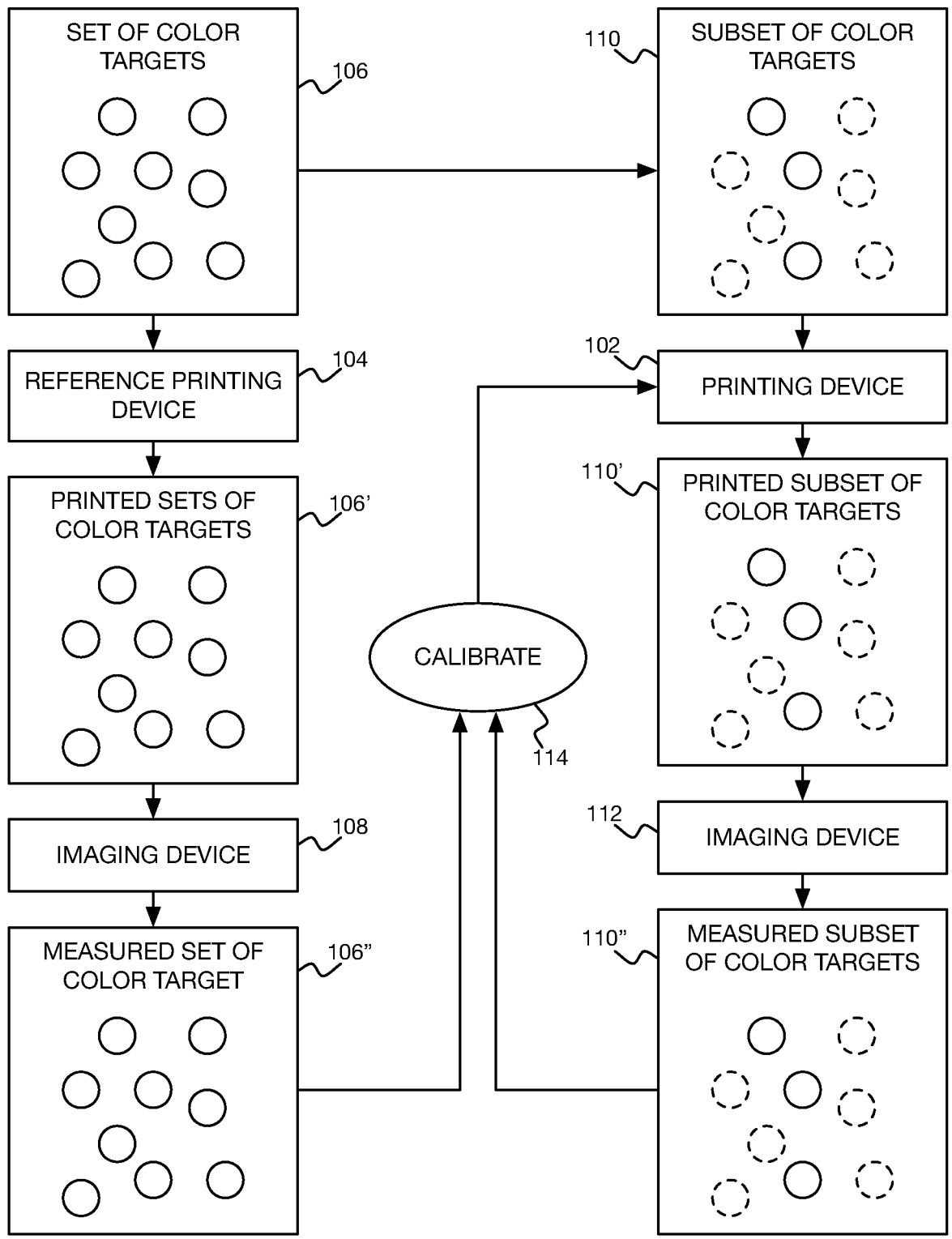
FIG. 1 is a diagram of an example process by which a printing device is calibrated for a particular media type.

As noted in the background, a printing device can include colorants corresponding to the colors of what is referred to herein as the native color space of the printing device, to permit the printing device to print full color images onto print media like paper. To print a particular color, the printing device may output different amounts of the colorants that in combination yield the color in question. In this way, the printing device can realize the full color gamut of its native color space, such as the cyan-magenta-yellow black (CMYK) color space. Other printing devices include three-dimensional (3D) printing devices, which output layers of material that build up upon one another to form a 3D object. Such material may also be considered colorant.

To realize a particular color, a printing device of a particular printing device type may be initially programmed to output a particular amount of each of its colorants. However, variations among printing devices of the same printing device type can result in differences in the actual color that the devices output for the same combination of particular colorant amounts. Furthermore, over time the actual color that a given printing device may itself output for the same combination of particular colorant amounts can vary. The type of print medium and the environment in which a printing device is operating can also affect the actual color that is output for a combination of particular colorant amounts.

To ensure accurate color fidelity in realizing the full color gamut of its native color space, therefore, a printing device may be initially and periodically calibrated. Color calibration generally involves the printing device printing a set of color targets of different colors onto a print medium like paper, and then measuring the color value of each color target using an imaging device like a scanner, a colorimeter, or a spectrophotometer. To the extent that the measured color value of each color target differs from the expected color value, the combination of particular colorant amounts to realize the color of this color target can be adjusted so that this color is more accurately achieved.

To attain maximum or optimal color fidelity, a printing device may have to print a large number of color targets during the color calibration process. Furthermore, this color calibration process may have to be repeated for every different media type, since media type can affect color fidelity. Printing a large number of color targets, particularly for each of what can be a potentially large number of different media types, can result in a tedious color calibration process for an end user to perform, and also consumes potentially expensive resources such as colorant like ink or toner. Insofar as a given printing device may have to be periodically recalibrated to account for variations that occur over the lifetime of the device as well as for environmental changes in which the printing device operates, color calibration can thus become a nuisance.

Techniques disclosed herein improve printing device color calibration. A reference printing device of a given printing device type may be calibrated for each of a number of different media types using a full set of color targets. Calibration of other printing devices of the same type for one of the media types can then leverage the calibration results of the reference printing device for this media type, so that the other printing devices may print just a subset of the set of color targets during calibration. Furthermore, once a printing device has been calibrated for one media type, it can be calibrated for another media type without having to print any color target, so long as the reference printing device has been calibrated for the same two media types.

FIG. 1 illustrates an example process by which a printing device 102 is calibrated for a media type. The printing device 102 can be an inkjet-printing device or a laser-printing device, for instance, and can print full-color images on print media like paper via a number of colorants corresponding to the colors of a native color space of the device 102, such as the CMYK color space. The printing device 102 is of a particular printing device type. For example, the printing device 102 may use a specific type of inkjet-printing or laser-printing engine that a given manufacturer produces. The printing device 102 may be calibrated at the location of an end user—i.e., "in the field," as opposed to by the manufacturer where the device 102 is made. The printing device 102 may be a 3D printing device in one implementation.

Calibration of the printing device 102 can leverage partial prior calibration of a reference printing device 104 of the same printing device type. The reference printing device 104 may be calibrated when development of the printing device type has been completed, and/or by the manufacturer, such as where devices of this printing device type are made. That is, end users, such as the end user of the printing device 102, may not perform calibration of the reference printing device 104. The printing device 104 is referred to as a reference printing device to distinguish the printing device 104 from the printing device 102.

The printing device 102 and the reference printing device 104 are calibrated with respect to a particular media type (e.g., the media type referenced above for which the printing device 102 is to be calibrated), which is referred to herein as the reference media type. This media type is referred to as a reference media type to distinguish it from other media types that are referred to later in the detailed description. The reference media type may be a type of media on which printing devices of the printing device type are most frequently expected to print on by end users, or a type of media on which the full color gamut of the native color space can be best reproduced using colorants of the printing devices.

Calibration of the reference printing device 104 can be more laborious than calibration of the printing device 102, or may use more resources like colorant and/or media than calibration of the printing device 102 does. Therefore, there may be an interest in the process of FIG. 1 because the end user of the printing device 102 may not have to use as many resources or spend as much time in calibrating the printing device 102 as the manufacturer does in calibrating the reference printing device 104. Furthermore, multiple printing devices 102 of the same printing device type can be calibrated after the reference printing device 104 has been calibrated.

In the process of FIG. 1, the reference printing device 104 prints a set of color targets 106 on a medium of the reference media type to output a printed set of color targets 106'. The printing device 104 has a hardware printing mechanism, such as an inkjet or a laser printing engine, having a number of colorants, like ink or toner, corresponding to the colors of a color space, such as the CMYK color space. This color space is referred to as the native color space of the printing device 104, because the printing device 104's hardware printing mechanism actually outputs colorant in colors of this color space.

The set of color targets 106 can include a complete set of different colors that are sufficient to calibrate printing devices of the same printing device type as the reference printing device 104 to a desired degree of accuracy. The set of color targets 106 thus can span the entirety of the native color space of the reference printing device 104, either uniformly or non-uniformly, with sufficient granularity that the desired accuracy of color calibration can be achieved. For each color target of the set 106, there is an expected color value, which may be specified in a model color space, such as the Lab color space, which is a device-independent color space that can have a gamut exceeding the gamut of the native color space, which is itself a subtractive color space that may be device dependent. The Lab color space can be more precisely referred to as the Lab color space defined by the International Commission on Illumination (CIE)—i.e., the CIE-Lab or CIELab color space.

An imaging device 108, such as a scanning device, an image-capturing device, a colorimeter, or a spectrophotometer, measures the printed set of color targets 106' as printed on the medium of the reference media type to generate a measured set of color targets 106". The imaging device 108 can generate or result in a measured color value of each color target in the model color space, for instance. If the reference printing device 104 were already perfectly calibrated, then each the measured color value of each color target within the set 106" would be identical to the expected color value of a corresponding color target of the set 106 that the reference printing device 104 printed as the printed set of color targets 106'. The set of color targets 106 is in digital form, which the reference printing device 104 effectively transforms to physical form by printing the set of color targets 106 as the printed set of color targets 106' on the medium of the reference media type. The imaging device 108 then transforms the printed set of color targets 106' back to digital form as the measured set of color targets 106".

Continuing in the process of FIG. 1, a subset 110 of the set of color targets 106 is selected. The subset of color targets 110 is smaller in number, and may be considerably smaller in number, than the set of color targets 106. The subset of color targets 110 is selected to approximate the set of color targets 106 to a desired degree of accuracy. For instance, the subset of color targets 110 may represent a uniform sampling of the set of color targets 106 consistent with the native color space of the printing device type of the printing device 102 and the reference printing device 104.

The printing device 102 to be calibrated prints the subset of color targets 110 on a medium of the reference media type to output a printed subset of color targets 110'. The printing device 102, in other words, does not have to print the entire set of color targets 106, but just the subset 110 thereof. Like the reference printing device 104, the printing device 102 includes a hardware printing mechanism that outputs colorants corresponding to the colors of the native color space of the printing device 102, such as the CMYK color space. An imaging device 112 measures the printed set of color targets 110' as printed on the medium of the reference media type to generate a measured subset of color targets 110", which includes a measured color value, such as in a model color space like the Lab color space, for each color target of the subset 110. The imaging device 112 may be of the same or different imaging device type as the imaging device 108, but is generally not the actual imaging device 108.

The printing device 102 can then be calibrated (114) using the measured set of color targets 106" and the measured subset of color targets 110". For instance, any color target of the set 106 that is not part of the subset 110 can have its measured value interpolated from the measured set of color targets 106" in comparison to the measured set of color targets 110". Therefore, calibration of the printing device 102 can be performed as if the entire set of color targets 106 were printed by the printing device 102, even using just the subset 110. The process of FIG. 1 leverages the insight that because the printing device 102 and the reference printing device 104 are of the same type, they are likely to reproduce colors of the native color space in a similar manner. As such, color targets of the set 106 not present in the set 110 can nevertheless have their color values accurately interpolated as if they were printed by the printing device 102 and measured by the imaging device 112. Calibration of the printing device 102 thus can consume fewer resources and/or occur more quickly than calibration of the reference printing device 104, while approaching the calibration accuracy of the device 104.

Figure 2:
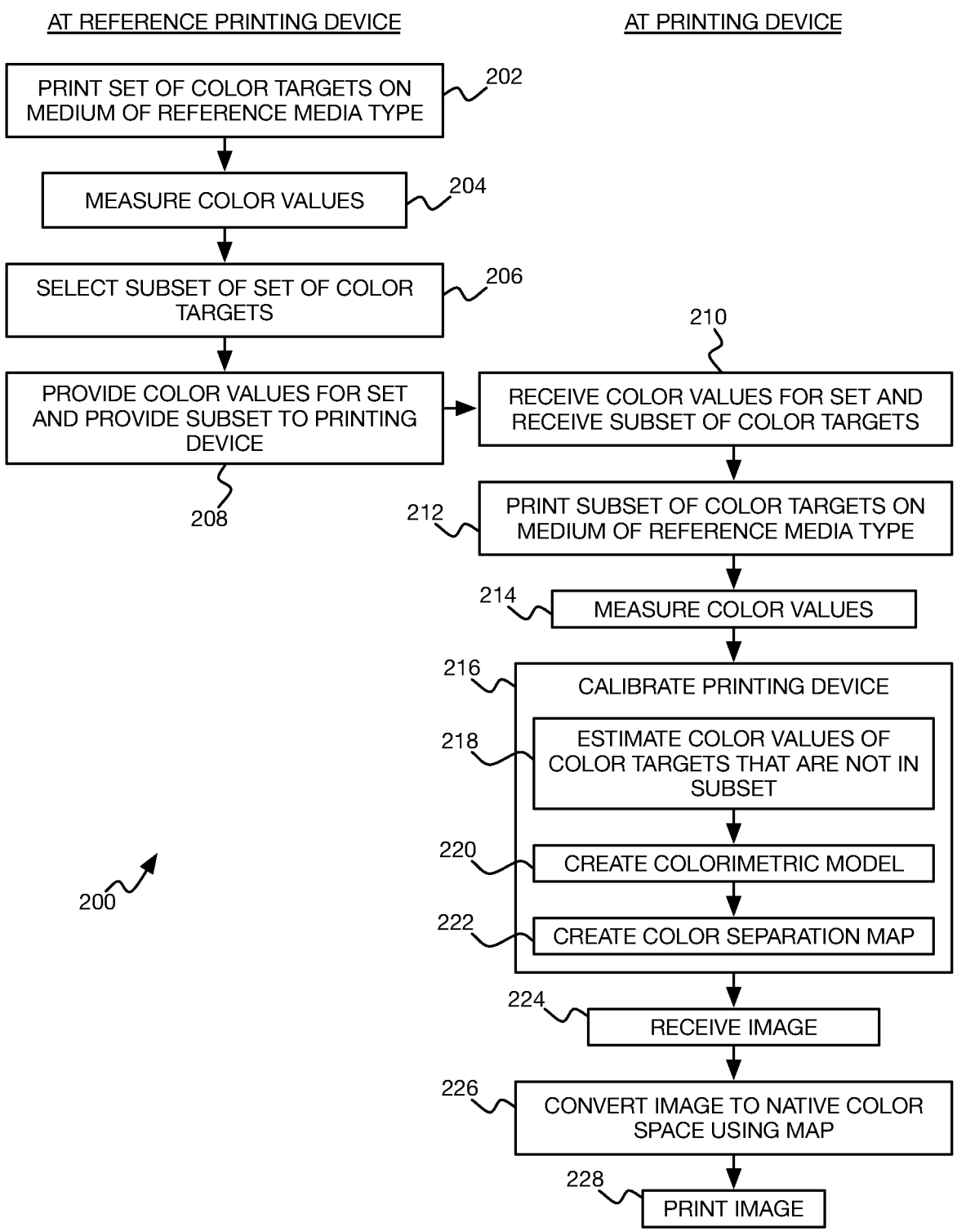
FIG. 2 is a flowchart of an example method for calibrating a printing device for a particular media type that is consistent with, but more detailed than, the process of FIG. 1.

FIG. 2 shows an example method 200 for calibrating a printing device that is more detailed than but consistent with the process of FIG. 1. Parts of the method 200 in the left column of FIG. 2 can be performed at or by a reference printing device, such as the reference printing device 104. Parts of the method 200 in the right column can be performed at or by a different printing device, such as a printing device "in the field" at an end user's location, like the printing device 102. The method 200 can be implemented completely or partially as program code, executable by processors of computing devices, or of printing devices.

The reference printing device prints a complete set of color targets sufficient to calibrate the printing device on a medium of a reference media type (202). It can be said in this respect that a hardware printing mechanism, like an inkjet printing engine or a laser printing engine, of the reference printing device is caused to print the set of color targets. The color values of the printed color targets are then measured (204), using an imaging device. The imaging device may be part of the reference printing device, such as a scanner that is inline with the printing path of the printing engine, downstream from the printing engine. The imaging device may be external to the printing device. The color values may be measured in a model color space, such as a device-independent color space like the Lab color space.

A subset of the set of color targets is selected (206). As noted above, the subset of color targets is smaller in number than the set of color targets as a whole. The subset is selected to approximate the set of color targets to a desired degree of accuracy with respect to printing device color calibration. The subset of color targets may be a uniform sampling of the set of color targets in this respect.

The reference printing device provides the measured color values for the set of color targets, and the subset of color targets, to the printing device (208), which is said to receive these measured color values and this subset (210). For example, during development of the printing device type of which the reference printing device and the printing device to be calibrated are examples or instances, parts 202, 204, and 206 of the method 200 may be performed upon satisfactory manufacturing completion of the reference printing device. The measured color values and the subset of color targets may then be stored in non-volatile memory of the printing device during its manufacture, or be provided in the form of a driver for the printing device or a printing device utility to be run by a host computing device (like a desktop or laptop computer) connected to the printing device. The measured color values and the subset of color targets may be provided to the printing device after the printing device has been deployed at its end use location, such as via a firmware update.

The printing device prints the subset of color targets on a medium of the reference media (212), as opposed to the entire set of color targets. The printed color targets then have their color values measured (214). The color values of the printed color targets are measured using an imaging device, which may be an inline scanner that is part of the printing device, a scanner that is part of the printing device but that may rely on a user to feed back a printed page into the printing device for scanning, or an external scanner. The imaging device may be a colorimeter or a spectrophotometer. The measured color values may be in a model, or device-independent color space, such as the Lab color space, where each color target has an expected color value. To the extent that the measured color values differ from the expected color values, the printing device is not calibrated for media of the reference media type.

Therefore, the printing device is calibrated (216). It is noted that in some implementations, parts 212 and 214 can be considered as part of the color calibration process of part 216. Color calibration of the printing device means that when the printing device is requested to print a particular color, the resulting color printed is as expected. For example, the printing device prints color in its native color space, such as the CMYK color space, but may be requested to print a color in an image color space, such as the red-green-blue (RGB) color space or another additive color space in which images to be printed by the printing device are formatted. If the CMYK color value to which an RGB is mapped for actual printing by the printing device results in an inaccurate or unexpected color printed (as may be measurable in a device-independent color space like the Lab color space), then the printing device is uncalibrated. Calibration adjusts the RGB-to-CMYK color value mappings so that the colors are printed as expected.

Printing device calibration includes estimating the color values of the color targets of the set of color targets that are not in the subset of color values that the printing device has printed (216). The color value of each such color target can be interpolated using the measured color values of neighboring color targets that the printing device did print, as well as the measured color values of these neighboring color targets as printed by the reference printing device, and the measured color value of the color target in question as printed by the reference printing device. Because the printing device is of the same printing device type as the reference printing device—for instance, both printing devices may have the same type or model of printing engine—such interpolation may accurately yield color values that the printing device would have printed. The interpolation used to estimate the color values of the color targets that the printing device did not print may be a linear or a non-linear interpolation.

Printing device calibration can then include creating or generating a colorimetric model, from the color values measured in part 214 and the color values estimated in part 218 (220). The colorimetric model maps the native color space of the printing device, such as the CMYK color space, to a device-independent color space, such as the Lab color space. The printing device can have different colorants corresponding to the colorants of the former color space, whereas the latter color space may be the color space in which the color values were measured (or to which the color values were converted after measuring). Therefore, for each of a number of different Lab color values, there is a corresponding CMYK color value within the colorimetric model, and vice-versa. The colorimetric model is created similar to how such a model can be created using just measured color values for color targets printed by a printing device, but also using estimated color values for color targets that were not printed by the printing device, to improve accuracy or granularity of the colorimetric model.

Printing device calibration then can include creating or generating a color separation map from the colorimetric model that has been created (222). A color separation map maps an image color space, such as the RGB color space, in which images to be printed by the printing device are received, to the native color space of the printing device, such as the CMYK color space. In this respect, a different colorimetric model mapping the image color space to the device-independent color space used in part 220 may be employed to map the image color space to the device-independent color space. Because the colorimetric model created in part 220 maps the native color space of the printing device to the device-independent color space, this means that the image color space can be mapped to the native color space.

For example, a colorimetric model that maps the RGB image color space to the device-independent Lab color space maps RGB color values to Lab color values. The colorimetric model generated in part 220 maps the CMYK native color space to the device independent Lab color space, and thus maps CMYK color values to Lab color values. Therefore, for each Lab color value, a corresponding RGB color value can be determined from the former color space and a corresponding CMYK color value can be determined from the latter color space. This RGB color value is thus mapped to this CMYK color value within the color separation map, which can be implemented as a look-up table by RGB color value. The color separation map is a separation map in that it specifies for each image space color value the separate color values of the native color space that the printing device uses to print the color in question.

The process that has been described in relation to FIGS. 1 and 2 permits a printing device to be calibrated for one media type, which is referred to as a reference media type, by printing just a subset of color targets, while providing for color calibration accuracy as if the full set of color targets were printed. This is achieved by leveraging the color value measurements of the full set of color targets as printed by another printing device, which is referred to as a reference printing device. That the reference printing device and the printing device that is being calibrated are of the same printing device type can also be leveraged to subsequently calibrate the printing device for other media types, without the printing device having to print any color targets, as described later in the detailed description.

Once the printing device has been calibrated per the method 200 of FIG. 2, an image having its color values specified in the image color space can be received (224) for the printing device to print. The image's color values are converted from the image color space to the printing device's native color space using the color separation map that has been generated in part 222 (226). Parts 224 and 226 may be performed by the printing device itself, or by a host computing device to which the printing device is communicatively connected. The printing device then prints the image (228). For a given converted CMYK color value of the image, for instance, there is a cyan color component value, a magenta color component value, a yellow color component value, and a black color component value. These values indicate the amount of correspondingly colored colorants for the printing device to output at a location on a medium of the reference media type to realize the CMYK color value in question.

Figure 3:
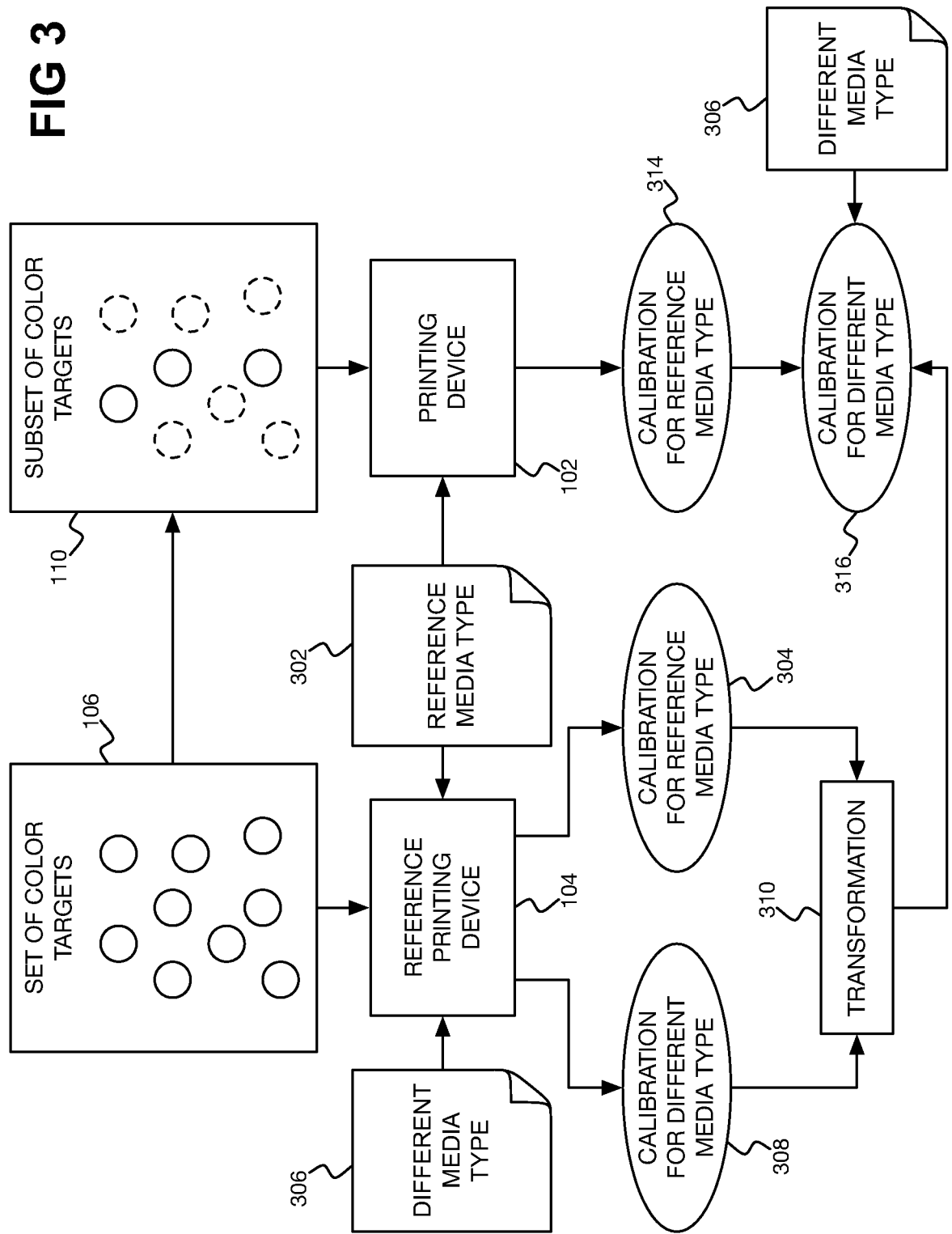
FIG. 3 is a diagram of an example process by which a printing device is calibrated for another media type once the printing device has been calibrated for a particular media type, such as in conjunction with the process of FIG. 1.

FIG. 3 illustrates an example process by which the printing device 102 of FIG. 1 is calibrated for a different media type after it has been calibrated for the reference media type consistent with the process of FIG. 1. The reference printing device 104 prints the full set of color targets 106 on a medium of the reference media type 302 so that calibration 304 of the reference printing device can be performed in relation to the reference media type 302. Similarly, the reference printing device 104 prints the full set of color targets 106 on a medium of a different media type 306 so that calibration 308 of the reference printing device can be performed in relation to the different media type 306.

An example of the manner by which the reference printing device 104 is calibrated for each of the reference media type 302 and the different media type 306 is described in detail later in the detailed description. However, in general, the reference printing device 104 can be calibrated for each of the media types 302 and 306 separately and independently. That is, calibration 304 of the reference printing device 104 for the reference media type 302 does not depend on calibration 308 of the reference printing device 104 for the different media type 306, and vice-versa. The calibration 304 can be performed before or after the calibration 308. The manner in which the calibration 304 is performed can be the same as the manner in which the calibration 308 is performed, with both calibrations 304 and 308 involving the printing of the full set of color targets 106, albeit on different types of media (the former on the media type 302 and the latter on the media type 306).

A transformation 310 from the calibration 304 of the reference printing device 104 for the reference media type 302 to the calibration 308 of the reference printing device 104 for the different media type 306 is then generated. The transformation describes how the calibration 308 differs from the calibration 304, with respect to the calibration 304. The transformation can be considered a functional transformation, in that inputting the calibration 304 for the reference media type 302 to the transformation results in the outputting of the calibration 308 for the different media type 306.

For example, the calibrations 304 and 308 each include a color separation map mapping a device-independent color space to a native color space. The transformation can thus functionally describe how the native color space value is modified from the calibration 304 for the reference media type 302 to result in the native color space value of the calibration 308 for the different media type 306. That is, the transformation maps the native color space color values of the calibration 304, such as CMYK color values, to the native color space color values of the calibration 308, also such as CMYK color values.

Next, the printing device 102 prints the subset 110 of color targets on a medium of the reference media type 302, and calibration 314 of the printing device 102 occurs on this basis, as well as by using the partial results of the calibration 304 of the reference printing device 104 for the reference media type 302. This calibration 314 is as has been described in relation to FIG. 1, and can be performed per the method 200 of FIG. 2 that has been described. That is, the calibration 314 uses the measured color values of the subset 110 of color targets printed by the printing device 102 itself, and the measured color values of the entire set 106 of color targets as printed by the reference printing device 104.

The printing device 102 undergoes calibration 316 for the different media type 306, without the printing device 102 having to print any color target of the set 106 of color targets (including the subset 110 thereof). Specifically, the transformation 310 is applied to the calibration 314 of the printing device 102 for the reference media type 302 to realize the calibration 316 of the printing device 102 for the different media type 306. The process of FIG. 3 thus leverages the similarity of the printing device 102 and the reference printing device 104. Since both printing devices 102 and 104 are of the same printing device type, the difference in calibration 314 for the reference media type 302 and calibration 316 for the different media type 306 as to the printing device 102 should correspond to the difference in calibration 304 for the reference media type 302 and calibration 308 for the different media type 306 as to the reference printing device 104. Therefore, the transformation 310 generated relative to the actual calibration 308 vis-à-vis the actual calibration 304 of the reference printing device 104 can be applied to the actual calibration 314 of the printing device 102 to realize the calibration 316 of the printing device 102, without the printing device 102 having to print anything on a medium of the different media type 306.

Figure 4:
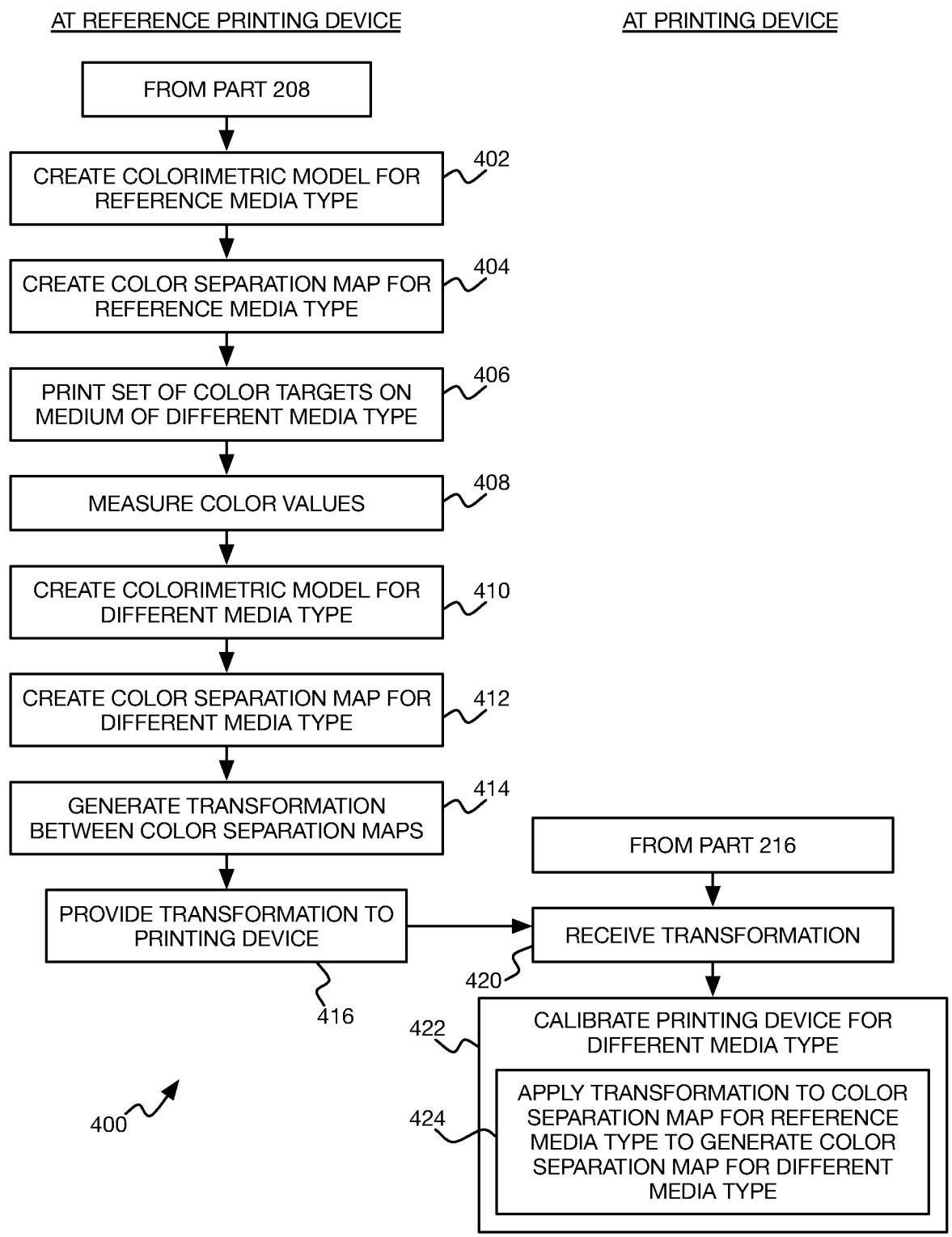
FIG. 4 is a flowchart of an example method for calibrating a printing device for another media type that is consistent with but more detailed than the process of FIG. 3.

FIG. 4 shows an example method 400 for calibrating a printing device that is more detailed than but consistent with the process of FIG. 3. As in FIG. 2, parts of the method 400 in the left column of FIG. 4 can be performed at or by a reference printing device, like the reference printing device 104, and parts in the right column can be performed at or by a different printing device, like the printing device 102. The method 400 can be implemented completely or partially as program code, executable by processors of computing devices or of printing devices.

The reference printing device is color calibrated for a reference media type. Thus, once parts 202, 204, 206, and 208 of FIG. 2 have been performed, a colorimetric model for the reference media type is created (402), from the color values measured in part 204 of the set of color targets printed by the reference printing device on a medium of the reference media type in part 202. The colorimetric model maps the native color space of the reference printing device to a device-independent color space, and vice-versa. A color separation map for the reference media type is then created or generated, which maps an image color space to the native color space. The colorimetric model and the color separation map can be generated in parts 402 and 404 as has been described in relation to parts 220 and 222 of FIG. 2, but as to the color values measured in part 204 of the set of color targets printed by the reference printing device on a media of the reference media type in part 202.

The color separation map generated in part 404 can be considered the culmination of the calibration process of the reference printing device for the reference media type. Calibration is then separately repeated for the different media type. As such, the reference printing device prints the set of color targets on a medium of this different media type (406), and color values of the printed set of color targets are measured (408). A colorimetric model is created for the different media type (410), from these measured color values, and a color separation map generated from this created colorimetric model (412). The color separation map generated in part 412 can similarly be considered the culmination of the calibration process of the reference printing device for the different media type.

A transformation between (from) the color separation map for the reference media type generated in part 404 and (to) the color separation map for the different media type generated in part 412 is then determined (414). For example, each color separation map can map a native color space of the reference printing device, such as the CMYK color space, to a device-independent color space, such as the Lab color space, but for different types of media. That is, each color separation map may map each color value in the CMYK color space to a corresponding color value in the Lab color space. Therefore, for a particular color value in the Lab color space, the transformation effectively maps the value in the CMYK color space specified for this Lab color space color value by the color separation map for the reference media type to the value in the CMYK color space specified for this Lab color space color value by the color separation map for the different media type. Applying the generated transformation to the color separation map for the reference media type generated in part 404, in other words, yields the color separation map for the different media type generated in part 412.

The reference printing device provides the generated transformation to the printing device to be calibrated (416). This printing device receives the generation transformation (420). The printing device has already been calibrated for the reference media type. That is, part 216 of FIG. 2 has been performed, such that the printing device has been calibrated on the basis of color values measured in part 214 of a subset of color targets printed in part 212, and on the basis of color values estimated in part 218 for the color targets that are not part of this subset and that were not printed.

The printing device is then calibrated for the different media type (422), without the printing device having to print any color target on a medium of the different media type. Rather, the transformation is applied to the color separation map of the printing device for the reference media type generated in part 212, to realize the color separation map for the different media type (424). Because the printing device is of the same printing device type as the reference printing device, in other words, the relationship between color separation maps for the different media type and the reference media type should be similar for each printing device. Therefore, the color separation map for the different media type is generated using actually printed color targets on a medium of this different media type just by the reference printing device. This color separation map can then be effectively leveraged to calibrate the printing device for the different media type in part 422, in the form of the transformation generated in part 416.

For example, the transformation maps each native color space color value to another native color space color value, where the former pertains to the reference media type and the latter pertains to the different media type. Therefore, the transformation can be applied in part 424 to each native color space color value of the printing device for the reference media type generated in part 222 of the method 200, to realize the native color space color value of the printing device for the different media type, without the printing device having to print on any medium of the different media type. In this way, the color separation map of the printing device for the different media type can be generated.

Figure 5:
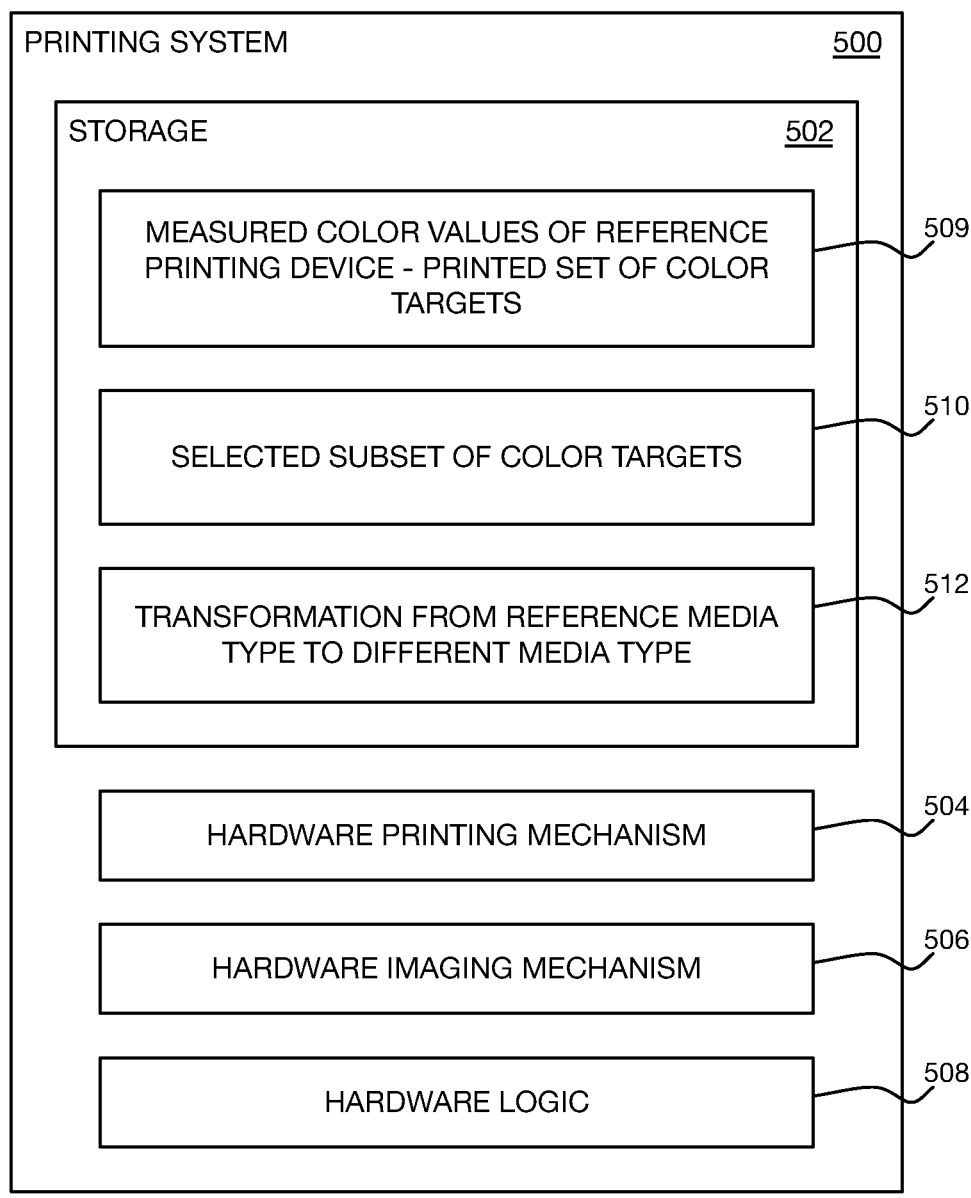
FIG. 5 is a block diagram of an example printing device that can perform the processes and methods of FIGS. 1-4.

FIG. 5 shows an example printing system 500. The printing system 500 may be a standalone printer, or an all-in-one (AIO) or multifunction printer (MFP) device that include functionality like scanning, copying, and/or faxing functionality in addition to printing functionality. In either case, the printing device includes the components depicted in FIG. 5. The printing system 500 may in another implementation include a host computing device, such as a desktop or laptop computer, and a printing device to which the host computing device is connected, such that some components of FIG. 5 are part of the host computing device, and other components are part of the printing device.

The printing system 500 can include a storage 502, a hardware printing mechanism 504, a hardware imaging mechanism 506, and hardware logic 508. The storage 502 may be a volatile or non-volatile solid-state or magnetic storage device. The storage 502 can store the measured color values 509 of the set of color targets that a reference printing device printed, such as the measured set 106" of color targets of FIG. 1. The storage 502 can store a selected subset 510 of this set of color targets, such as the subset 110 of FIG. 1. The storage can store a transformation 512 from a reference media type to a different media type, such as the transformation 310 of FIG. 3.

The hardware printing mechanism 504 outputs colorants corresponding to the colors of a color space like the CMYK color space, which is the native color space of the printing system 500. The hardware printing mechanism 504 may be an inkjet printing mechanism, in which case the colorants are ink. The hardware printing mechanism 504 may be a laser printing mechanism, in which case the colorants are toner. The hardware printing mechanism 504 may be another type of printing mechanism as well, such as a 3D printing mechanism.

The hardware imaging mechanism 506 images color targets printed on a physical medium to measure color values of the color targets. The hardware imaging mechanism 506 can be a scanning device like a scanner, which may be inline in a printing path downstream from the hardware printing mechanism 504. As such, once a physical medium like a sheet of paper has been printed on by the hardware printing mechanism 504, the physical medium can be scanned by the hardware imaging mechanism 506 without a user having to manually reinsert the physical medium into the system 500. The hardware imaging mechanism 506 can also be separate from a printing device that includes the hardware printing mechanism 504, or be a part of the printing device but may have a user to manually reinsert physical media into the device for scanning. The hardware imaging mechanism 506 can measure color values in a model color space, such as a device-independent color space like the Lab color space, or may measure color values in another color space, such as the RGB color space, which can then be converted to the Lab (or another) color space.

The hardware logic 508 can be implemented as a processor and a non-transitory computer-readable data storage medium that stores program code executable by the processor. The hardware logic 508 may be implemented in another manner as well, such as an application-specific integrated circuit (ASIC). The hardware logic 508 performs parts of the methods 200 and 400 of FIGS. 2 and 4 that have been described, such as those parts of the methods 200 and 400 that are in the right column of these figures. As such, the hardware logic 508 can calibrate the hardware printing mechanism 504 via suitable control of the hardware printing mechanism 504 and/or the hardware imaging mechanism 506, using the information stored on the storage 502. The hardware logic 508 can calibrate the hardware printing mechanism 504 for a reference printing medium, such as in accordance with FIG. 2, and also a different printing medium, such as in accordance with FIG. 4.

The techniques described herein provide for efficient accurate color calibration of a printing device, by leveraging color calibration of a reference printing device of which the printing device is the same type. As to a reference media type, the printing device just has to print a subset of color targets while still providing for color calibration as if an entire set of color targets were printed. Once the printing device has been calibrated for this reference media type, the printing device can then be color calibrated for another, different media type without having to print any color targets on a medium of the latter media type.

We claim:

1. A printing system comprising:
a hardware printing mechanism of a same type as that of a reference printing device different than the printing system in that both the hardware printing mechanism and the reference printing device are capable of printing a set of color targets;
a storage to store measured color values of colors of a model color space, for all of the set of color targets previously printed by the reference printing device on a medium of a reference media type; and
and
hardware logic to:
as a part of a calibration process of the printing system, cause the hardware printing mechanism to print just a subset of the set of color targets, and not any other color targets of the set even though the hardware printing mechanism is capable of printing all of the set of color targets, on another medium of the reference media type;
as part of the calibration process, measure color values of the colors of the model color space, for the subset that the hardware printing mechanism printed; and
as part of the calibration process, calibrate the hardware printing mechanism for the reference media type, based on the measured color values for the set of color targets previously printed by the reference printing device and based on the measured color values for the subset that the hardware printing mechanism printed.

2. The printing system of claim 1, wherein the hardware logic is to calibrate the hardware printing mechanism for the reference media type by:
estimating color values of the colors of the model color space, for the set of color targets other than the subset that the hardware printing mechanism printed, from the measured color values stored for the set of color targets previously printed by the reference printing device and from the measured color values for the subset that the hardware printing mechanism printed.

3. The printing system of claim 2, wherein the hardware printing mechanism is to output colorants corresponding to colors of a native color space, and wherein the hardware logic is to calibrate the hardware printing mechanism for the reference media type by further:
creating a colorimetric model mapping the colors of the native color space to the colors of the model color space, from the measured color values for the subset that the hardware printing mechanism printed and from the estimated color values for the set of color targets other than the subset that the hardware printing mechanism printed; and
creating a color separation map mapping colors of an image color space to the colors of the native color space.

4. The printing system of claim 3, wherein the hardware logic is further to:
convert an image from the image color space to the native color space using the created color separation map; and
cause the hardware printing mechanism to print the converted image.

5. The printing system of claim 3, wherein the storage is to further store a transformation from the native color space for the reference media type to the native color space for a different media type and corresponding to the set of color targets previously printed by the reference printing device on a medium of the different media type relative to the set of color targets previously printed by the reference printing device on the medium of the reference media type,
and wherein the hardware logic is further to calibrate the hardware printing mechanism for the different media type by applying the transformation to the created color separation map to generate a different color separation map for the different media type, without the hardware printing mechanism printing any of the set of color targets on any medium of the different media type.

6. The printing system of claim 1, wherein the hardware printing mechanism is to output colorants corresponding to colors of a native color space,
wherein the storage is to further store a transformation from the native color space for the reference media type to the native color space for a different media type and corresponding to the set of color targets previously printed by the reference printing device on a medium of the different media type relative to the set of color targets previously printed by the reference printing device on the medium of the reference media type,
and wherein the hardware logic is further to calibrate the hardware printing mechanism for the different media type, based on prior calibration of the hardware printing mechanism for the reference media type and based on the transformation, without the hardware printing mechanism printing any of the set of color targets on any medium of the different media type.

7. The printing system of claim 3, wherein the model color space is a device-independent color space, the native color space is a subtractive color space, and the image color space is an additive color space.

8. The printing system of claim 7, wherein the model color space is a Lab color space, the native color space is a cyan-magenta-yellow-black (CMYK) color space, and the image color space is a red-green-blue (RGB) color space.

9. The printing system of claim 1, further comprising:
a hardware imaging mechanism along a media output path downstream from the hardware printing mechanism to scan a current medium traveling along the media output path after the hardware printing mechanism has printed on the current medium.

10. A non-transitory computer-readable data storage medium storing program code executable to:
calibrate a hardware printing mechanism of a printing system for a reference media type, the hardware printing mechanism outputting colorants corresponding to colors of a native color space, the printing system being different than a reference printing device, the hardware printing mechanism being a same type as that of the reference printing device in that both the hardware printing mechanism and the reference printing device are capable of printing a set of color targets; and
calibrate the hardware printing mechanism for a different media type, based on prior calibration of the hardware printing mechanism for the reference media type and based on a transformation from the native color space for the reference media type to the native color space for a different media type, without the hardware printing mechanism having to print any color targets on any medium of the different media type,
wherein the transformation corresponds to all of the set of color targets previously printed by the reference printing device on a medium of the different media type relative to all of the set of color targets previously printed by the reference printing device on a medium of the reference media type.

11. The non-transitory computer-readable data storage medium of claim 10, wherein the hardware printing mechanism is calibrated for the different media type without the hardware printing mechanism printing any of the set of color targets on any medium of the different media type.

12. The non-transitory computer-readable data storage medium of claim 10, wherein the hardware printing mechanism is calibrated for the reference media type by:
measuring color values of colors of a model color space, for a subset of the set of color targets that the hardware printing mechanism printed on a medium of the reference media type;
estimating color values of the colors of the model color space, for the set of color targets other than the subset that the hardware printing mechanism printed, from measured color values stored for the set of color targets previously printed by the reference printing device on another medium of the reference media type and from the measured color values for the subset that the hardware printing mechanism printed;
creating a colorimetric model mapping the colors of the native color space to the colors of the model color space, from the measured color values for the subset that the hardware printing mechanism printed and from the estimated color values for the set of color targets other than the subset that the hardware printing mechanism printed; and creating a color separation map for the reference media type, the color separation map mapping colors of an image color space to the colors of the native color space.

13. The non-transitory computer-readable data storage medium of claim 12, wherein the hardware printing mechanism is calibrated for the different media type by applying the transformation to the created color separation map to generate a different color separation map for the different media type.

14. A method comprising:
printing, using a hardware printing mechanism of a reference printing device, a set of color targets on a medium of a reference media type;
measuring color values of colors of a model color space for the set of color targets that the hardware printing mechanism printed;
selecting a subset of the set of color targets, the subset of color targets sufficient to calibrate a printing system for the reference media type without the printing system having to print the set of color targets other than the subset even though the printing system is capable of printing all of the set of color targets, the printing system being different than the reference printing device, the printing system having a hardware printing mechanism of a same type as the hardware printing mechanism of the reference printing device in that both the hardware printing mechanism of the printing system and the hardware printing mechanism of the reference printing device are capable of printing all of the set of color targets; and
providing the color values for the set of color targets and providing the subset of color targets to the printing system, the color values and the subset of color targets permitting calibration of the printing system for the reference media type without the printing system printing the set of color targets other than the subset.

15. The method of claim 14, wherein the hardware printing mechanism outputs colorants corresponding to colors of a native color space, and wherein the method further comprises:
creating a color separation map for the reference media type based on the measured color values, the color separation map mapping colors of an image color space to the colors of the native color space;
printing, using the hardware printing mechanism, the set of color targets on a medium of a different media type;
measuring different color values of the colors of the model color space for the set of color targets that the hardware printing mechanism printed on the medium of the different media type;
creating a different color separation map for the different media type based on the measured different color values, the different color separation map mapping the colors of the image color space to the colors of the native color space;
generating a transformation from the colors of the native color space within the color separation map for the reference media type to the colors of the native color space within the different color separation map for the different media type, the transformation sufficient to calibrate the printing system for the different media type after the printing system has been calibrated for the reference media type, without the printing system having to print any color target on any medium of the different media type; and providing the transformation to the printing system, permitting calibration of the printing system for the different media type without the printing system printing any color target on any medium of the different media type.

* * * * *